United States Patent Office 3,316,908
Patented May 2, 1967

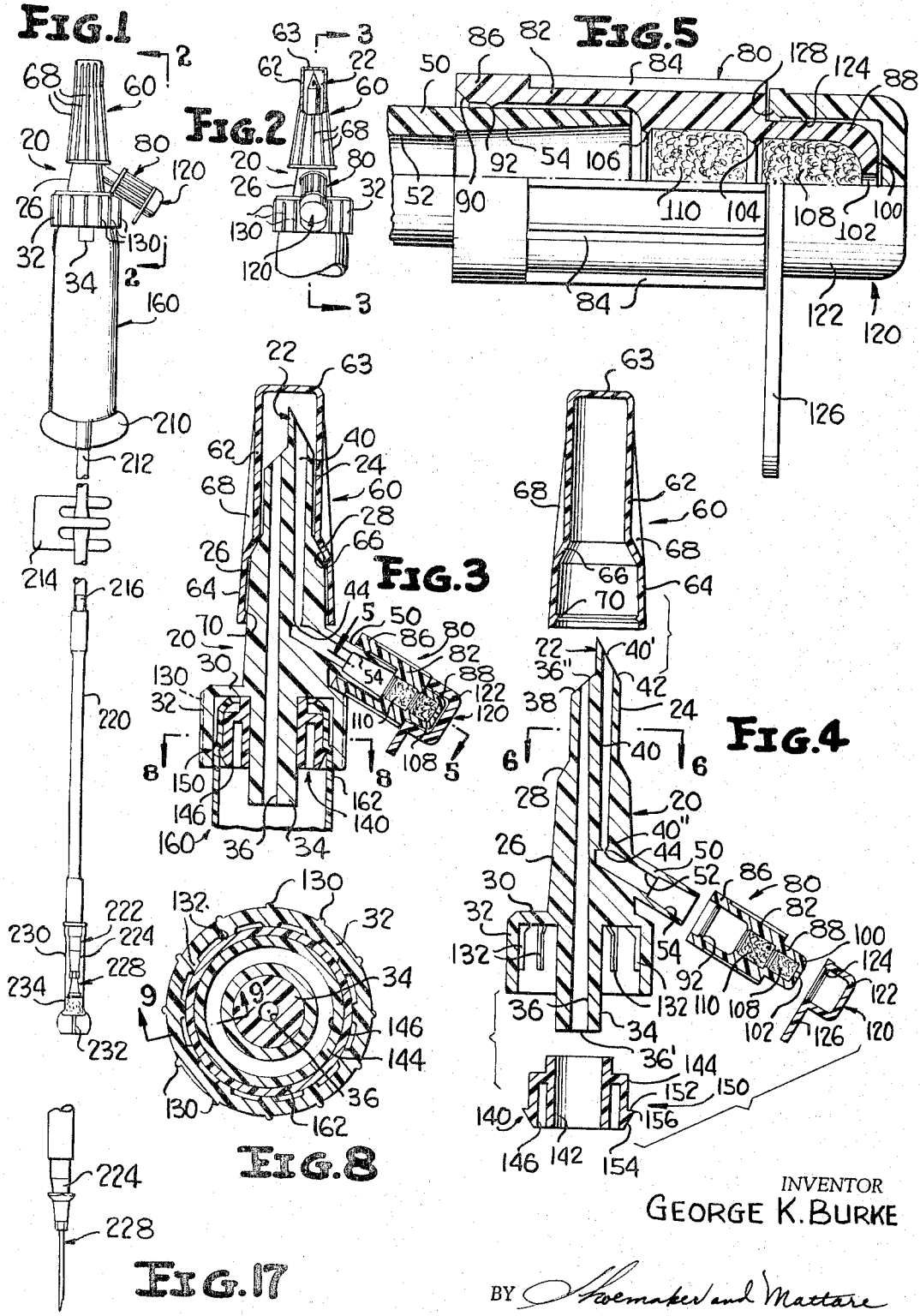

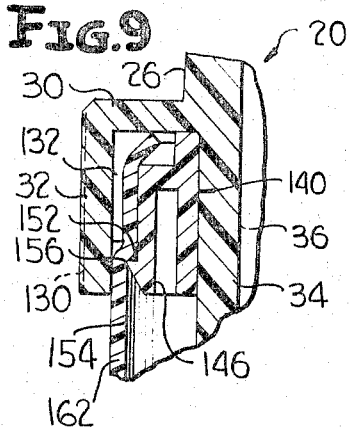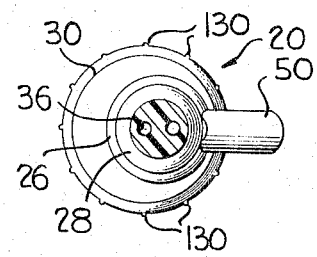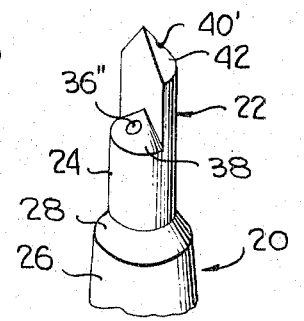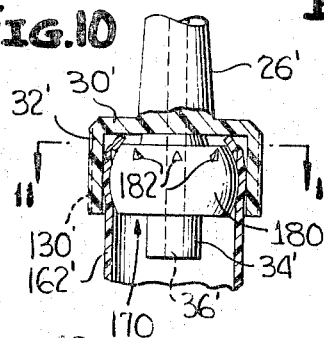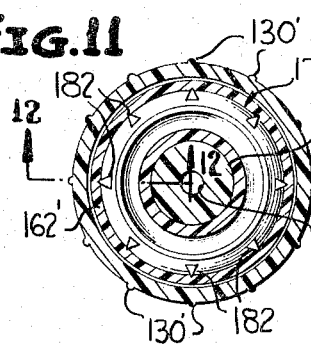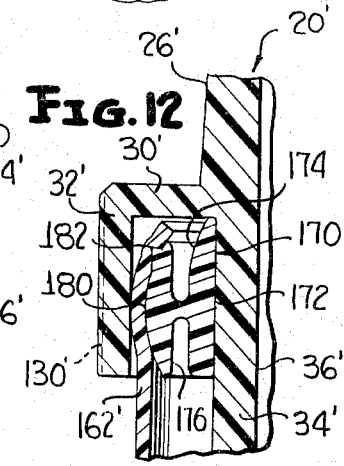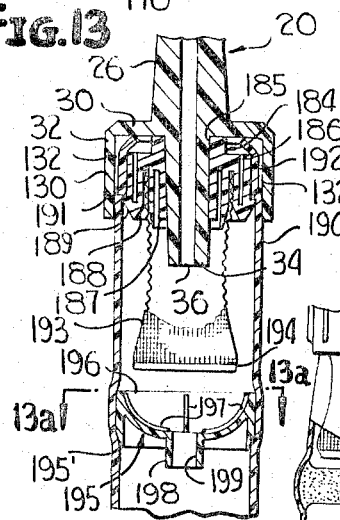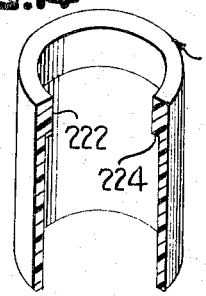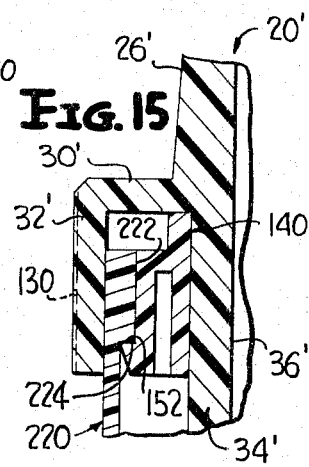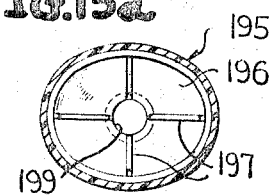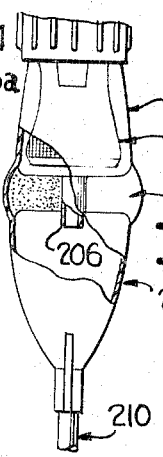

3,316,908
INTRAVENOUS INJECTION APPARATUS
George K. Burke, Bethlehem, Pa., assignor to Burron Medical Products, Inc., Bethlehem, Pa.
Filed Apr. 14, 1964, Ser. No. 359,675
28 Claims. (Cl. 128—214)

The present invention relates to new and novel intravenous injection apparatus, and more particularly to improvements in certain portions of the apparatus as employed for feeding blood or other intravenous solutions into the bloodstream of a patient.

Conventional intravenous injection apparatus ordinarily includes a so-called piercing device or spike which is adapted to be inserted into an opening provided in a cap generally formed of rubber on an intravenous or blood bottle. In order to facilitate insertion of the piercing device into such cap, the piercing device is provided with a sharpened end portion.

Different types of bottles are employed for this purpose, and the conventional bottles now employed have rubber stoppers with different size openings therein. It is accordingly a feature of the present invention to provide a piercing device having a pair of tapered outer surface portions one of which is of substantially greater cross sectional dimension than the other so as to facilitate a snug fit with different size openings as provided in the stoppers of such bottles.

It is apparent that the tapered outer configuration will ensure that a snug fit will be obtained even though there are slight variations in the size of the openings within which the piercing device is fitted.

The two tapered outer surface portions on the body means of the piercing device are interconnected by an intermediate beveled shoulder portion. A guard means is provided for normally protecting the sharpened end portion of the piercing device, and the guard means which is of elongated hollow construction is provided with an intermediate internal shoulder which is adapted to rest against the shoulder formed on the outer surface of the piercing device body means for limiting the movement of the guard means and for properly positioning it in its operative position.

When the guard means is disposed about the sharp end portion of the piercing device body means, the sharp end is completely protected, and the aforementioned inter-cooperating shoulders prevent the end of the guard means itself from touching the sharp end portion. In addition, the open end of the guard means which fits about the body means of the piercing device is provided with an internal peripherally extending rib which not only serves to hold the guard means in its proper position but additionally provides a sterile seal therewith.

It is noted that the entire intravenous injection apparatus of the present invention is ordinarily shipped and sold as a sterile package, and the various components of the invention are specifically designed to maintain a sterile condition of the apparatus until it is actually used.

The piercing device of the present invention is of the dual flow type including a pair of passages formed therethrough, each of these passages opening through the sharp end portion of the body means. A first one of such passages comprises a liquid flow passage, and this passage tapers from the bottom or opposite end portion of the dual flow piercing device toward the sharp end portion thereof with the smallest cross sectional dimension of such passage being disposed at the sharp end portion. In other words, as the liquid flows downwardly through this liquid flow passage, the passage flares outwardly. This particular downwardly flaring configuration of the liquid flow passage is such as to facilitate the formation of drops of liquid as the liquid emerges from the lower portion of the dual flow piercing device. This is a desirable feature since it is preferred to have drops formed as the liquid leaves the piercing device and enters into the drip chamber associated therewith.

The other of the passages provided within the dual flow piercing device is an air passage, this air passage including a substantial tapered portion which tapers from the sharp end portion of the piercing device to a point spaced a substantial distance therefrom, with the largest dimension of such air flow passage being disposed at the sharp end portion. This tapered air passage portion in turn is in communication with an air inlet portion which is formed within a laterally extending projection of the body means so as to admit air into the apparatus.

The tapered configuration of the air flow passage is such as to facilitate the formation of bubbles as the air passes upwardly through the passage and into the liquid disposed in the associated bottle. This is a very desirable feature, and the upwardly flared configuration of the air flow passage assures this desired end result.

The air flow passage is also provided with an intermediate portion of restricted cross sectional dimension so as to serve somewhat as a metering arrangement to provide a uniform flow of air and also to assist in the formation of the bubbles as aforementioned.

The air inlet portion provided in the laterally extending projection of the body means is provided with an internal bore of a tapered configuration which is adapted to snugly receive an adapter means as hereinafter described and which is provided with a corresponding taper. With this arrangement, the adapter means of another unit can be connected with the air inlet portion of the unit whereby a continuous flow of liquid may be assured, and under such circumstances the air inlet passage will become a liquid flow passage as described in detail hereinafter.

Novel air filter means is provided in association with the air inlet portion so as to provide a sterile seal with the air inlet portion and to effectively filter any air entering through this air inlet portion and into the air flow passage which subsequently conducts the air into the bottle associated with the apparatus. The sterile seal means on the air filter is so positioned when assembled as to ensure sterility of the area adjacent to the air inlet of the laterally extending air inlet portion. When this filter means is later removed, and an adapter means from an additional apparatus is inserted therein, it will not contact the area of possible contamination.

This air filter means is of a unique construction and includes two separate filter bodies therewithin which serve to provide a two-stage filtering action which has been found to be very effective in actual use and which thoroughly ensures that any air drawn through the air filter apparatus will be sterile.

Closure cap means is provided for closing off the air inlet opening provided in the air filter means, this closure cap means being so constructed as to form a sterile seal with the air filter means and to prevent any entrance of air into the apparatus until the closure cap means is removed. This closure cap means in fact controls the flow of liquid out of an associated bottle, and the liquid will not commence to flow regularly from the bottle until this closure means is removed so as to initiate normal operation of the apparatus.

While the aforementioned closure means is in its operative closed position, the liquid within the associated bottle cannot under normal conditions pass downwardly into an associated drip chamber, and furthermore the liquid cannot leak downwardly through the air flow passage in the body means so as to contaminate the filter material disposed within the associated air filter. This is an important feature of the present invention since in certain prior art arrangements the liquid can flow downwardly through the air flow passage and severely inhibit the proper operation of the air filter means or in fact render it inoperative.

The dual flow piercing device of the present invention also includes novel means for effectively connecting the body means with a flexible drip chamber means. This has proved to be a difficult problem in the prior art particularly in view of the fact that the relatively rigid piercing device is generally formed of a different material than the flexible drip chamber means. These components are usually formed of different plastic substances which are difficult to properly bond together with adhesive substances. Accordingly, prior art devices have proved unsatisfactory in many cases due to an ineffective bond being obtained between the piercing device and the drip chamber.

The present invention overcomes difficulties in connecting the drip chamber with the piercing device by providing a unique mechanical interconnection between the piercing device and the drip chamber which serves to very securely clamp the drip chamber in operative position. This mechanical connection may be supplemented by an adhesive interconnection if desired.

Several different modifications are illustrated of the means for clamping the drip chamber in operative position, and in each case the interconnection is afforded by the cooperation of a cavity defining flange formed on the piercing device body means and an annular connector means having means formed on the outer surface thereof for engaging the inner wall of the drip chamber and for tightly wedging the wall of the drip chamber between the connector means and said flange.

An additional feature of the present invention is the provision of filter means which may be disposed within an associated drip chamber and which is adapted to filter liquid passing downwardly through the liquid flow passage in the body means so as to effectively remove any solids such as clots or other visible foreign material when blood is being fed through the apparatus, for example. This filter means may either be supported in the same manner as the associated drip chamber as by being wedged in place by said connector means, or as an alternative the connector means may be provided with a suitable means for supporting and holding the filter means in the desired operative position.

As illustrated, the apparatus is provided with a specially designed connector means which supports the filter means in operative position with an associated drip chamber. When such a filter means is employed, means is provided for separating the drip chamber into a filter area and a drip area. This means for so dividing the drip chamber may take the form of a mechanical divider which fits snugly within a conventionally constructed drip chamber, or on the other hand, the drip chamber may be so modified as to be heat sealed at an intermediate portion thereof, with a suitable drip tube being inserted in operative position within this heat sealed area.

An object of the present invention is to provide new and novel intravenous injection apparatus which is adapted to be utilized for feeding blood or other intravenous solutions into the bloodstream of a patient.

Another object of the invention is to provide a dual flow piercing device for use with intravenous injection apparatus which is adapted to be inserted into an opening formed in the cap of an intravenous or blood bottle and to provide a snug fluid-tight fit with such cap when inserted in different size openings.

A further object of the invention is the provision of a dual flow piercing device having a sharp end portion and having guard means associated therewith to protect the sharp end of the piercing device, the arrangement including means for limiting movement of the guard means with respect to the piercing device to prevent the guard means itself from damaging the sharp end portion of the piercing device body means.

Still another object of the invention is to provide a dual flow piercing device having air passage means therein of a particular construction so as to facilitate the formation of bubbles by the air flowing into an associated bottle through the air flow passage, and further to facilitate the formation of drips of the solution flowing through the liquid flow passage of the piercing device and into an associated drip chamber.

Yet another object of the invention is the provision of a dual flow piercing device having an air inlet portion provided with a tapered configuration which enables a complementary shaped member to be readily disposed therewithin and connected thereto.

A still further object of the invention is the provision of a dual flow piercing device including an air inlet portion and a filter means associated with the air inlet portion, the filter means being so constructed and arranged as to effectively filter the air entering into the apparatus and to maintain such air sterile.

A further object of the invention is to provide a dual flow piercing device including an air inlet portion and a filter means therefor, and further including closure means for sealing the air inlet portion of the filter means to prevent the entrance of air into the apparatus until desired thereby controlling the operation of the feeding system and preventing any liquid from leaking into the filter material of the air filter means.

Another object of the invention is the provision of a dual flow piercing device including novel means for effectively connecting the piercing device with a drip chamber means.

Yet a further object of the invention is to provide intravenous injection apparatus including liquid filter means for effectively filtering liquid passing from the piercing device into a drip chamber associated therewith.

Other objects and many attendant advantages of the invention will become more apparent when considered in connection with the specification and accompanying drawings, wherein:

FIG. 1 is an elevational view partly broken away illustrating the over-all intravenous injection apparatus according to the present invention;

FIG. 2 is a view taken substantially along line 2—2 of FIG. 1 looking in the direction of the arrows and being partly broken away;

FIG. 3 is an enlarged sectional view taken substantially along line 3—3 of FIG. 2 looking in the direction of the arrows;

FIG. 4 is an exploded view on a slightly enlarged scale illustrating the components as shown in FIG. 3;

FIG. 5 is an enlarged sectional view taken substantially along line 5—5 of FIG. 3 looking in the direction of the arrows;

FIG. 6 is a sectional view taken substantially along line 6—6 of FIG. 4 looking in the direction of the arrows;

FIG. 7 is an enlarged top perspective view of the sharpened end portion of the body means;

FIG. 8 is a sectional view taken substantially along line 8—8 of FIG. 3 looking in the direction of the arrows;

FIG. 9 is a sectional view taken substantially along line 9—9 of FIG. 8 looking in the direction of the arrows;

FIG. 10 is a view partly in section illustrating a modified form of connector means according to the present invention;

FIG. 11 is a sectional view taken substantially along line 11—11 of FIG. 10 looking in the direction of the arrows;

FIG. 12 is a sectional view taken substantially along line 12—12 of FIG. 11 looking in the direction of the arrows;

FIG. 13 is a vertical section through a modified form of the invention incorporating a liquid filter means;

FIG. 13a is a sectional view taken substantially along line 13a—13a of FIG. 13 looking in the direction of the arrows;

FIG. 14 is a top perspective view partly broken away illustrating the modified form of the upper wall portion of an associated drip chamber;

FIG. 15 illustrates the modified drip chamber means as shown in FIG. 14 in operative clamped position within the body means;

FIG. 16 is an elevational view partly broken away for the purpose of illustration showing a modified form of drip chamber according to the present invention; and FIG. 17 is a view of the lower portion of the overall intravenous injection apparatus illustrating the hypodermic needle attached to the adaptor means and ready for use.

Referring now to the drawings wherein like reference characters designate corresponding parts throughout the several views, and in particular to FIGS. 1 through 4 inclusive, the body means of the dual flow piercing device of the present invention is indicated generally by reference numeral 20 and is formed of a relatively rigid material such as a ABS plastic which comprises a mixture of acrylonitrile, butadiene and styrene resins. It is apparent that any suitable material may be used, but this particular substance provides the desired characteristics for this type of use. The body means is of elongated configuration and includes a sharp upper end portion indicated generally by reference numeral 22 as seen in the drawings, this sharp end portion being adapted to be inserted in the hole of an intravenous or blood bottle as the case may be.

The body means includes a first tapered outer surface portion 24 and a second tapered outer surface 26, these two tapered outer surface portions being joined by a beveled intermediate shoulder portion 28. It will be noted that the two outer surface portions 24 and 26 are substantially frustro-conical in configuration and are so constructed as to ensure a snug fit within the hole within which they are received. The beveled shoulder portion 28 also facilitates insertion of the body means as far as possible in an associated hole.

The body means also includes an enlarged base portion 30 which joins with a downwardly extending annular flange portion 32 defining an annular cavity therewithin for receiving the upper end of a drip chamber as hereinafter described.

The body means also includes a downwardly extending integral extension 34 of generally cylindrical outer configuration, and a passage 36 extends completely through the body, the passage opening at the bottom thereof as indicated at 36′ and also opening through a sloping surface 38 at the sharp end portion 22 of the body means as indicated at 36″.

This passage 36 is a liquid flow passage and is continuously tapered from the lower end 36′ thereof to the upper end 36″ thereof such that its largest dimension is at the point 36′ and the smallest cross sectional dimension is at the point 36″. As discussed previously, this particular configuration of the liquid flow passage facilitates formation of drops of liquid as they emerge from the bottom of the piercing device, such drops being necessary to determine the flow rate.

The body means is also provided with an air flow passage indicated by reference numeral 40 which extends substantially parallel with the liquid flow passage 36, the air flow passage opening at its upper end 40′ through a sloping surface 42 defined at the sharpened end portion 22 of the piercing device.

This air flow passage 40 includes a substantial tapered portion extending from the open upper end 40′ thereof to a point 40″, the passage being continuously tapered between these points and having its largest cross sectional dimension at the point 40′ and its smallest cross section dimension at the point 40″.

The air passage also includes a restricted portion 44 immediately below the tapered portion previously described, this restricted portion serving more or less as a metering arrangement for controlling the flow of air through the air passage.

The body means also includes an integral laterally extending projection 50 having a passage 52 formed therewithin which in turn is in communication with the air flow passage 40 and which also joins with a tapered bore portion 44 which opens outwardly. Portion 50 is in fact an air inlet portion through which air is adapted to enter the body means and through passage 52 is fed into the air flow passage 40 and thence upwardly into an associated bottle.

It will be noted as seen in FIG. 4 that when the piercing device is in its normal operative position, as inserted in a suitable bottle, the air outlet portion 40′ is disposed vertically above the liquid inlet opening 36″ to thereby ensure that the maximum amount of liquid is evacuated from the associated bottle. The location of the air outlet above the level of the fluid inlet and on the opposite side of the sharpened end portion of the body means causes less interference with the fluid flow into its inlet. By locating the air outlet at a higher level, less resistance to rise of the air bubbles is encountered, and the relative relationship of the air outlet and the liquid inlet openings encourages a cycle of air flowing in and liquid flowing out of the associated bottle. The liquid inlet opening should be kept larger than the air outlet opening in the bottle so as to produce an increase flow of liquid and in effect create a vacuum to draw in more air and to keep the cycle going.

A guard means is indicated generally by reference numeral 60 and may be formed of a semi-rigid plastic substance such as polyethylene or vinyl. The guard means includes an elongated hollow body portion 62 having a closed end 63 and an enlarged open end portion 64 with an intermediate internal shoulder portion 66 disposed between these two portions. It will be noted that the upper part of the guard body means as seen in the drawings is substantially cylindrical in configuration while the lower open end portion 64 may be provided with a taper similar to that provided on the lower surface 26 of the body means.

A plurality of spaced longitudinally extending ribs 68 are provided on the outside of the body means to reinforce and rigidify the body means. The open end portion 64 of the body means is provided with a peripherally extending radially inwardly directed rib 70 which is adapted to engage the outer tapered surface portion 26 of the body means as seen particularly in FIG. 3 in order to retain the guard in operative position on the body means and to provide a sterile seal therewith.

As seen in FIG. 3, it is noted that when the guard is in operative position on the body means, it provides protection for the sharp end portion of the piercing device, and it will be noted that the internal shoulder 66 formed on the guard rests against the outer beveled shoulder 28 provided on the body means to limit downward movement of the guard with respect to the piercing device. This prevents the closed end 63 from engaging the sharp end of the piercing device and possibly dulling the same. It is apparent that when it is desired to use the piercing device, the guard can simply be pulled off of the upper portion of the piercing device with manual effort.

An air filter means is indicated generally by reference numeral 80 and includes an elongated hollow body means 82 formed of a suitable plastic substance such as polyethylene or the like. This main body means has a plurality of spaced circumferentially extending ribs 84 formed on the outer surface thereof, the body means terminating in a first open end portion 86 and an opposite closed end portion 88 of reduced diameter, the main body portion being substantially cylindrical in configuration.

The open end portion of the air filter means is provided with a beveled entrance portion 90 for facilitating mounting of the air filter means over the outer end portion of the projection 50 on the body means into the operative position shown in FIGS. 3 and 5.

The open end portion of the air filter means is also provided on the internal surface thereof with a peripherally extending radially inwardly directed rib 92 which is adapted to snugly engage the outer surface of the portion 50 of the body means so as to retain the air filter means in operative position thereon and to provide a sterile seal therewith.

The reduced end portion 88 is provided with an end wall 100 having a central hole 102 formed therethrough through which air is adapted to enter the filter device.

A pair of spaced peripherally extending radially inwardly directed ribs 104 and 106 are provided so as to define a pair of spaced chambers a first one of which is formed between the end wall 100 and the rib 104 and which receives a filter body 108, and a second chamber being defined between ribs 104 and 106 and receiving a second filter body 100.

The two filter bodies 108 and 110 are separate from one another as shown and they each comprise a body of absorbent or non-absorbent sterile cotton. It has been found in actual practice that this two-stage filter means ensures that the air entering through the air filter device and into the air passage of the body means will remain substantially sterile during operation of the apparatus.

A closure means is provided for closing off the hole 102 through the reduced end portion 88 of the air filter means, and this closure means takes the form of a closure cap indicated generally by reference numeral 20 and including a substantially cup-shaped main body portion which is adapted to fit about the reduced end portion of the air filter means as seen particularly in FIGS. 3 and 5. The closure cap is preferably formed of a flexible material such as rubber or the like which can be readily moved into operative position as shown and removed therefrom when desired.

The main cup-shaped body portion 122 is provided on the internal surface thereof with a peripherally extending radially inwardly directed rib 124 which is adapted to snugly engage the outer surface of the reduced portion 88 of the air filter means as seen most clearly in FIG. 5 to maintain the closure cap in operative position and to provide a sterile seal therewith and assure that no air can enter through the hole 102 in the end of the air filter means.

The body portion 122 of the closure cap is provided with an integral laterally extending tab portion 126 which is adapted to be manually grasped for removing the closure cap when desired to initiate operation of the apparatus.

The body portion 122 is also provided with a beveled entrance portion 128 as seen in FIG. 5 which facilitates movement of the closure cap into its operative sealing position as seen in this figure.

The downwardly extending annular flange portion 32 at the attaching base portion of the body means is provided with a plurality of spaced longitudinally extending ribs 130 formed on the outer surface thereof, and a corresponding number of longitudinally extending spaced ribs 132 are formed on the inner surface thereof. The ribs 132 are adapted to cooperate with a connector means for securely connecting the upper end of a drip chamber in operative position relative to the body means.

A first form of a connector means adapted to be utilized in the present invention is indicated generally by reference numeral 140, this connector means being of generally annular configuration with a central bore 142 formed therethrough of such a dimension as to snugly fit about the extension 34 of the body means when the connector is in operative position as for example illustrated in FIG. 3 of the drawings. This connector means 140 may either be snugly fitted on the extension 34 without any additional means of securing these two portions together, or a suitable adhesive substance may be employed for securing member 140 to the extension 34. The connector may be formed of the same plastic material as the body means, thereby facilitating interconnection of the connector with the body means by a suitable adhesive or bonding substance.

As seen particularly in FIGS. 4 and 9, connector means 140 includes a lower enlarged body portion 144 having an annular groove 146 formed in the undersurface thereof. The connector has formed on the outer surface thereof a peripherally extending outwardly directed gripping shoulder indicated generally by reference numeral 150. This gripping shoulder is formed by providing a sloping outer surface 154 and a flat annular shoulder 152 facing toward the upper portion of the connector, portions 152 and 154 being joined by an annularly extending flat 156 which defines a cylindrical surface on the outer portion of the connector.

As seen particularly in FIG. 1, a drip chamber is indicated generally by reference numeral 160 and is of generally tubular configuration having an open upper end which is substantially cylindrical and which fits within the flange 32 of the body means. This drip chamber is preferably formed of a flexible transparent material such as polyvinylchloride plastic.

As seen especially in FIGS. 3 and 9, the open upper wall portion 162 of the drip chamber is shown in clamped position within the cavity defined by downwardly extending flange 32. It will be noted that the connector 140 is firstly inserted within the open upper end of the drip chamber, this insertion preferably being made when the material of which the drip chamber is constructed is hot thereby enabling the drip chamber to shrink into the operative position shown so as to positively prevent the drip chamber material from pulling away from the connector means.

The connector means and the associated drip chamber are then forced upwardly within the cavity defined in the attaching base portion of the body means so as to wedge the upper wall portion 162 of the drip chamber between the peripherally extending gripping shoulder 150 and the ribs 132 formed on the internal surface of flange 32. This gripping action is quite clear from an inspection of FIGS. 3 and 9 wherein the upper wall portion of the drip chamber will be seen to be tightly clamped and wedged into position whereby the entire assembly is operatively locked in the assembled position. If desired, the joint so formed may be supplemented by providing an adhesive substance between the flange portion 32 and the outer wall of the drip chamber.

Attention is particularly directed to the provision of the flat 156 formed on the outer surface of the gripping shoulder. This flat edge is preferred to a sharp edge at this point since if a sharp edge were directed outwardly into contact with the inner surface of a drip chamber, it would tend to dull, whereas with the arrangement shown the edges do not tend to dull. This enables the edge defined between the flat 156 and the annular shoulder 152 to remain sharp no matter how many times the connector may be re-used in actual practice.

Referring now particular to FIGS. 10, 11 and 12 of the drawings, a modification is illustrated wherein the piercing device body means may be of the same construction as that previously described, and accordingly the parts illustrated of the piercing device have been given the same reference numerals primed. The only difference in the construction of the body means as illustrated in FIGS. 10–12 inclusive as compared to that previously described is the fact that no internal ribs are provided in the downwardly extending flange portion 32'. In other words, the internal surface of flange portion 32' as shown in FIGS. 10–12 defines a smooth cylindrical surface.

In this particular modification, a modified connector means is indicated generally by reference numeral 170 and is generally annular in configuration, having a central bore 172 formed therethrough which is adapted to fit snugly about the extension 34' of the body means.

Connector means 170 is provided with an annular groove 174 formed in the upper surface thereof and an annular groove 176 formed in the undersurface thereof. The outer surface 180 of this particular connector means is substantially barrel shaped in configuration, and a plurality of angularly spaced outwardly directed sharpened projections 182 are provided on the outer surface of the connector means.

It will be apparent as seen for example in FIG. 12 that the barrel shaped outer configuration of this connector means will serve to wedge the upper wall portion 162' of the associated drip chamber against the inner wall of the flange portion 32' of the body means, and in addition the sharpened projections 182 will tend to dig into the inner wall surface of the drip chamber so as to ensure that the drip chamber cannot pull out of the clamped position as shown in these figures of the drawing.

The connector means in this latter modification may also be formed of a material similar to that of the body means, and auxiliary adhesive means may be employed for retaining the components in the operative position shown in FIG. 12 if desired. The maximum diameter of this particular modification is defined at that central portion at which the barrel shaped outer surface 180 has its greater diameter, and the sharpened ends of projections 182 do not extend outwardly of this diameter.

Here again, the connector means is first inserted in the open upper end of the drip chamber, preferably while the drip chamber is hot so that the drip chamber can shrink into the position illustrated in FIG. 12. The assembly of the drip chamber and the connector means is then moved upwardly within the cavity defined by flange portion 32' to hold the various components in the assembled locked position as illustrated.

Referring now particularly to FIG. 13 of the drawing, a modified form of the invention is illustrated wherein a filter means is incorporated in the apparatus. In this modification, a modified annular connector means is indicated generally by reference numeral 184, this connector means being associated with a body means identical with that previously described.

Connector means 184 is provided with a central bore 185 which snugly receives the extension portion 34 of the body means. A first annular groove 186 is provided in the upper surface of connector means 184 and a pair of annular grooves 187 and 188 are formed in the undersurface of the connector member, it being noted that tapered entrance portions are provided into groove 188 which is adapted to receive the filter means hereinafter described.

Connector means 184 also includes a lower beveled edge 189 which is adapted to facilitate entry of the connector means in the open upper end of the drip chamber means indicated in this modification by reference numeral 190, and which may be similar to the drip chamber means previously described.

Connector means 184 is provided with a shoulder portion 191 similar to the shoulder portion 152 previously described, this shoulder portion being a peripherally extending area which is adapted to clamp the upper end 192 of the drip chamber in operative position as in the previously described modifications.

A filter means is indicated by reference numeral 193, this comprising a liquid filter in the form of sheet tubular material of a suitable substance such as nylon mesh which is of porous construction and which is adapted to freely pass liquid therethrough and to filter out solid particles such as blood clots, corings from rubber stoppers, and flakes or precipitates from the filtered solution.

The upper end portion of the filter means is disposed within annular groove 188 provided in the undersurface of connector means 184. The upper end of the filter means is retained in operative position by any suitable means, and it may be either mechanically clamped in operative position or secured in the groove by a suitable body of adhesive substance and the like.

As seen in FIG. 13, the lower end of the filter means is closed by a flat seam or seal indicated by reference numeral 194. There may be a tendency for the inner wall of the drip chamber means 190 to engage this elongated flat seal portion, and accordingly the divider means hereinafter described is especially designed to protect this lower end portion of the filter means.

The divider means as illustrated in FIGS. 13 and 14 is indicated generally by reference numeral 195 and includes a central substantially concave recess portion 196 in the upper surface thereof, a plurality of reinforcing ribs 197 being provided on this concave surface to rigidify the structure. The divider includes a depending tubular portion 198 having a bore 199 formed therethrough which in effect provides a drip tube which enables drops of liquid to be observed and counted as required to determine the flow rate.

It will be noted that the divider 195 includes a depending flange portion which terminates in a beveled lower edge 195' which facilitates entry of the divider means into the open upper end of the drip chamber means 190 whereby the divider means may be moved into their operative position as shown in FIG. 13.

It will be noted that the divider means is in contact with a substantial portion of the inner surface of the drip chamber 190 such that the divider is prevented from tilting or turning with respect to the drip chamber. The divider means may be formed of a suitable plastic and is of such a dimension as to create a tight seal between the outer surface of the divider means and the inner wall of the drip chamber.

As seen particularly in FIG. 13a, the divider means when seen from the top is of oval or elliptical configuration. The divider means is so mounted within the drip chamber that the long dimension of the elliptical configuration of the divider means is parallel with the flat seal 194 on the filter means. With this arrangement the divider means ensures that the walls of the flexible drip chamber 190 assume a similar configuration adjacent the lower end of the filter means to thereby prevent the inner wall of the drip chamber from coming into contact with the lower end of the filter means thereby protecting the lower sealed end of the filter means.

Referring now particularly to FIG. 16, a modified form of the invention is illustrated wherein a drip chamber is indicated generally by reference numeral 200, this drip chamber being secured to the body means in the same manner as that discussed in connection with FIG. 13. A filter means is indicated generally by reference numeral 202 and may be substantially identical with the filter means 193 previously described.

In this modification, a central area of the drip chamber is heat sealed as indicated at 204 about a central drip tube portion 206 formed of a suitable plastic and the like. With this arrangement, it is apparent that the drip chamber is effectively divided into an upper filter area and a lower drip area, the two areas being separated from one another by the heat sealed central area of the drip chamber and being interconnected by the drip tube portion 206.

The lower drip area of the drip chamber is indicated generally by reference numeral 208 and is connected with a tubular portion 210 extending downwardly therefrom. It is apparent that the apparatus as illustrated in FIG. 16 will operate in a manner similar to that discussed in connection with FIG. 13.

Referring now particularly to FIGS. 14 and 15, a further modified form of the invention is illustrated wherein the body means may be constructed similar to the modification illustrated in FIGS. 10 through 12 such that the internal ribs and the flange portion 32' are eliminated.

In this particular modification, the tubular drip chamber is indicated generally by reference numeral 220. An auxiliary annular strip of material 222 is secured to the upper inner surface of the drip chamber, material 222 being similar to that of the main portion of the drip chamber and being suitably secured thereto as by heat fusion or solvent bonding. Where two similar plastics are employed, heat fusion is the preferred method of bonding, and the auxiliary annular strip of material is fused into a single piece along with the original main wall portion of the drip chamber. Any suitable means may be provided for connecting these portions to one another.

The internal strip of material 222 defines a downwardly facing surface 224 which as seen in FIG. 15 is adapted to rest upon the upwardly facing surface 152 defined on the connector means 140 previously described. It is apparent that the intercooperation of these components will be such as to positively prevent the drip chamber from being pulled out of the operative position as illustrated, the connector 140 being preferably held onto the extension 34' as by means of a suitable adhesive.

Referring now particularly to FIG. 1, the lower end of the drip chamber 160 is sealed as indicated at 210 and is provided with a central opening which is in communication with a conduit means 212. A suitable conventional manually operated clamp 214 is employed in conjunction with conduit means 212 for controlling the flow of liquid therethrough.

Conduit 212 is preferably formed of a flexible polyvinylchloride plastic which is transparent, and the opposite end portion of this conduit is provided with a tubular insert 216 formed of a suitable rigid plastic material such as nylon and which keeps the vinyl tubing from collapsing when a tubing portion 220 which is preferably formed of rubber-latex material or the like is attached thereto.

The lower end of tubing 220 is connected with an adapter indicated generally by reference numeral 222 and which includes a terminal end portion having an external taper 224 formed thereon which is complementary to the taper 54 formed within the air inlet portion such that the portion 224 can be fitted snugly within portion 54 previously described.

A conventional needle means indicated generally by reference numeral 228 is provided with the elongated hollow portion of the needle fitting up within the hollow bore formed through adapter 222, a hollow needle guard tubular portion 230 being disposed about this assembly and preferably being formed of a material such as semi-rigid medical polyvinylchloride or polyethylene plastic.

The lower end of the guard member 230 is preferably sealed and provided with a central hole 234, a body of filter material 234 such as sterile absorbent cotton being provided within the guard for maintaining a sterile condition therewithin.

As mentioned previously, the over-all intravenous injection apparatus as shown in FIG. 1 is shipped as a sterile package and a sterile condition is maintained until it is desired to be used. When the apparatus is to be used, the structure as shown in FIG. 1 can be removed from a sterile surrounding package and the guard means 60 removed from the sharp end of the piercing device. The piercing device can then be inserted into an opening provided in the cap of a suitable bottle.

The tubing clamp means 214 can either be operated to close the tubing or not as desired, but the closure cap 120 is maintained in its closed sealing position as shown for example in FIGS. 1-3.

Since the closure means remains in its sealed position, the system is inoperative and no liquid will flow from the associated bottle through either of the passages provided in the body means of the piercing device. The flexible drip chamber is then squeezed a few times to force the air within the drip chamber upwardly through the passage 36 and into the bottle allowing a certain amount of liquid to be displaced from the bottle downwardly into the drip chamber. After the desired amount of liquid has accumulated in the drip chamber, the closure cap is removed by grasping the integral tab formed thereon and air is allowed to flow freely into the bottle through the air filter means and the air flow passage of the piercing device. The system is then in operative condition and liquid will flow downwardly into the drip chamber and thence outwardly through the conduit means associated therewith in accordance with the setting of the clamping means associated with the conduit means. As seen in FIG. 17, the lower end of the injection apparatus is illustrated, and the needle guard portion 230 has been removed along with the filter material disposed therewithin. The needle 228 has been removed from the adapter means 224 and reversed in position, whereupon the needle has been mounted on the tapered portion 224 of the adapter. This lower end of the apparatus is now in condition for use and the needle may be inserted in the vein of a patient.

It is apparent that the apparatus is then in condition for continuously feeding liquid from an associated bottle through the apparatus and into the bloodstream of a patient.

It should be noted that the air inlet portion which is provided with a tapered bore may receive a plug means of some sort to close off the flow of air if desired, and as mentioned previously is adapted to receive the adapter means 224. With this latter arrangement, it is possible to continue to continuously utilize a certain injection apparatus as illustrated in FIG. 1 without removing the needle from the patient. In order to accomplish this operation, when the bottle associated with one of the piercing devices 20 has been substantially exhausted, a second bottle may be interconnected with a similar piercing device and apparatus as shown in FIG. 1. This latter apparatus may then be connected with the other previously mentioned piercing device by connecting the adaptor means of the apparatus connected with a full bottle with the air inlet portion of the piercing device associated with a bottle which is substantially exhausted and which is in turn connected with a needle which is inserted in a patient's bloodstream.

The liquid may then flow out of the new full bottle through one of the units as illustrated in FIG. 1 and thence into the air inlet portion of another of the units which has been previously connected to the patient such that a continuous flow of liquid may be maintained through the first connected piercing device without interrupting the flow of liquid for any substantial period of time and without necessitating the removal of the needle from the patient or without requiring that the first connected piercing device be disconnected.

It is apparent from the foregoing that there is provided according to the present invention new and novel intravenous injection apparatus which is adapted to be utilized for feeding blood or other intravenous solutions into the bloodstream of a patient. The invention includes a dual flow piercing device adapted to be inserted into an opening formed in the rubber cap of an intravenous or blood bottle and to provide a snug fluid-tight fit with different size openings as may occur in such caps. The particular tapered configuration of portions of the liquid flow passage and the air flow passage facilitate the formation of drops of liquid and bubbles of air respectively as is desired. Novel means is provided in the form of a special attaching base portion on the piercing device and associated connector means for interconnecting the piercing device with a drip chamber means. Means is also provided in the form of a guard for protecting the sharp end of the piercing device to ensure that it will not be damaged, means further being provided on the guard to ensure that the guard itself cannot come into contact with the sharp edge of the piercing device. The air inlet portion of the body means is provided with a tapered internal bore construction to enable a plug or other apparatus of similar construction to be fitted therewith as described hereinbefore. An air filter means is provided which effectively provides two stages of filtering so as to ensure that the air entering the apparatus is sterile. A closure means is also provided for sealing off the air filter means and preventing leakage of liquid from the bottle until desired. A modified form of the apparatus additionally includes liquid filter means to remove undesired solid particles from the liquid being fed to the patient.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A dual flow piercing device for use in intravenous injection apparatus comprising a body means formed of substantially rigid material and having a sharp end portion, said body means having a pair of oppositely tapering passages formed therethrough, each of said passages opening through the sharp end portion of said body means and each of said passages also opening through a portion of said body means spaced a substantial distance from said sharp end portion, said body means including an attaching base portion, said attaching base portion defining an annular cavity, said body means including a central extension extending through the central area of said annular cavity, the inner surface of said base portion which defines said annular cavity having gripping means formed thereon, flexible drip chamber means and connector means engaging said body extension and which means includes an outer surface portion cooperating with said gripping means to retain the flexible drip chamber means in clamped position within said attaching base portion.

2. Apparatus as defined in claim 1 wherein said connector means is of substantially annular configuration, said connector means fitting snugly about said body extension, said connector means including an annular groove formed in the undersurface thereof.

3. Apparatus as defined in claim 1 wherein said connector means is of generally annular configuration including a central bore formed therethrough which snugly fits about said body extension, said connector means having an annular groove formed in the undersurface thereof, and said connector means including a peripherally extending outwardly projecting gripping shoulder adapted to engage the inner surface of a flexible drip chamber means and to clamp the drip chamber means between said shoulder and the gripping means formed in the internal surface of said attaching base portion.

4. A dual flow piercing device for use in intravenous injection apparatus comprising a body means formed of substantially rigid material and having a sharp end portion, said body means having a pair of oppositely tapered passages formed therethrough, each of said passages opening through the sharp end portion of said body means and each of said passages also opening through a portion of said body means spaced a substantial distance from said sharp end portion, said body means including an attaching base portion, said attaching base portion defining an annular cavity, said body means including a central extension extending through the central area of said annular cavity, flexible drip chamber means, and connector means of generally annular configuration having a central bore therethrough which fits snugly about said body extension, said connector means having an annular groove formed in the upper surface thereof and also having an annular groove formed in the lower surface thereof, and said connector means having a plurality of spaced gripping projections formed on the outer surface thereof and extending outwardly thereof for engaging the inner surface of a flexible drip chamber means.

5. A dual flow piercing device for use with intravenous injection apparatus comprising a body means formed of substantially rigid material and having a sharp end portion, said body means having a tapered outer surface portion to adapt the body means to be fitted within openings of different sizes, said body means having a pair of passages formed therethrough, each of said passages opening through said sharp end portion, an air inlet portion projecting laterally from said body means, and having an internal tapered bore portion to receive a complementary shaped member, one of said passages being in communication with said air inlet portion and tapering from an intermediate portion to said sharp end portion and having its largest dimension in said tapered portion at said sharp end portion, the other of said passages being tapered from one end to the other thereof and having its smallest dimension at said sharp end portion, tubular drip chamber means, said body means including an attaching base portion defining an annular cavity, a central extension integral with said body means and extending through the central portion of said cavity, the lower wall portion of said attaching base portion having internal ribs spaced on the inner surface thereof clamping said tubular drip chamber means in operative position between said inner surface and said central extension.

6. Apparatus as defined in claim 5 wherein said body means includes in addition to said tapered outer surface portion a second tapered outer surface portion of substantially greater cross sectional dimension, said two tapered outer surface portions being joined by a beveled shoulder portion, and a guard means comprising an elongated hollow body having a closed end portion and an open end portion and including an intermediate internal shoulder portion, said guard means fitting about and enclosing said sharp end portion with the internal shoulder of said guard means seated on the shoulder on the outer surface of said body means to limit movement of said guard means with respect to said body means, the open end portion of said guard means having an internal peripherally extending sealing rib formed thereon engaging the outer surface of said body means and providing a sterile seal therewith.

7. Intraveneous injection apparatus comprising a body means formed of relatively rigid material and having a sharp end portion, said body means having a pair of passages formed therethrough and each opening through said sharp end portion, each of said passages having a substantial portion thereof tapering toward said sharp end portion, one of said passages comprising an air passage and tapering to its largest dimension at said sharp end portion, the other of said passages comprising a liquid passage and tapering to its smallest dimension at said sharp end portion, said body means including an air inlet portion opening laterally of said body means, said air passage being in communication with said air inlet portion, said liquid passage opening through the bottom portion of said body means, said body means including an attaching base portion defining an annular cavity with an integral portion of said body means extending centrally through said annular cavity, a drip chamber comprising a tubular member having an open upper end disposed within said annular cavity, the lower end of said drip chamber having an opening formed therein, conduit means connected with said opening, and connector means disposed within the open upper end of said drip chamber and being formed of relatively rigid material, said connector means being substantially annular in configuration with a central bore therethrough, said central bore being snugly fitted about said extension of the body means, said connector means having means formed on the outer surface thereof for engaging the inner surface of the upper wall portion of said drip chamber and for clamping said wall portion of the drip chamber between said connector means and the inner wall of the attaching base portion of said body means.

8. Apparatus as defined in claim 7 wherein said attaching base portion has spaced rib means formed on the inner surface thereof for engaging the outer surface of the upper wall portion of the drip chamber.

9. Apparatus as defined in claim 7 wherein the portion of said connector means which engages the upper wall of said drip chamber includes an annular shoulder, the outermost portion of said shoulder comprising a flat extending annularly about the connector means, said connector means having an annular groove formed in the undersurface thereof.

10. Apparatus as defined in claim 7 wherein said connector means has an annular groove formed in the upper surface thereof and an annular groove formed in the lower surface thereof, said connector means including an outer surface which is substantially barrel shaped in configuration, and said outer surface having a plurality of space projections formed thereon which engage the inner wall of the drip chamber.

11. Apparatus as defined in claim 7 wherein the open upper end of said drip chamber includes an inwardly extending portion defining an annular surface facing away from the open end of the drip chamber, and said connector means defining an annular shoulder facing toward said body means for engaging and supporting said last-mentioned surface formed on said drip chamber for retaining the drip chamber in operative position.

12. A dual flow piercing device for use with intravenous injection apparatus comprising a body means formed of a substantially rigid material, said body means being elongated and having a sharp end portion for insertion into a receiving opening, said body means having a pair of passages formed therein, each of said passages opening through said sharp end portion of the body means, one of said passages being a liquid flow passage and opening through the opposite end portion of said body means, the other of said passages comprising an air flow passage, said body means having a laterally extending projection, said air flow passage opening at its opposite end through said projection, and air filter means associated with said projection, said air filter means comprising an elongated hollow means having an open end portion fitted about said projection and sealed with respect thereto, said open end portion of said air filter means including a peripherally extending radially inwardly directed rib for engaging the outer surface of said body projection, the opposite end portion of said filter means having an opening formed therein, and said air filter means including two separate filter bodies therewithin for filtering any air entering through said last-mentioned opening in the air filter means, said air filter means including two separate internal areas within which said filter means is disposed and means for maintaining said filter bodies separated from one another.

13. A dual flow piercing device for use in intravenous injection apparatus comprising a body means formed of a substantially rigid material, said body means being elongated and defining a sharp end portion and an opposite attaching base portion, said body means having a pair of passages formed therethrough with each of said passages opening through said sharp end portion, a first one of said passages comprising a liquid flow passage with the opposite end thereof opening through said attaching base portion, the other of said passages comprising an air flow passage, said body means including a laterally extending projection, said projection defining an air inlet portion with said air passage in communication therewith, air filter means comprising an elongated hollow member having an open end portion fitting about said laterally extending projection, said open end portion having a peripherally extending rib formed on the inner surface thereof for providing a seal with respect to said projection, said filter means having an opening at the opposite end thereof, and two separate filter bodies disposed within said filter means for filtering any air entering through said opening, and closure means for closing off said opening in the air filter means until a desired time whereupon the closure means can be readily removed.

14. Apparatus as defined in claim 13 wherein said closure means is formed of a resilient material and includes a main substantially cup-shaped portion, said filter means including a reduced end portion, said cup-shaped portion being fitted over said reduced end portion, and means on said closure means and extending about the inner surface thereof for engaging the outer surface of the reduced portion of said air filter means for providing a seal therewith and for preventing the entrance of air through the opening in said air filter means until the closure means is removed.

15. A dual flow piercing device for use with intravenous injection apparatus comprising a body means formed of a substantially rigid material, said body means being elongated and having a sharp end portion, said body means having formed therethrough a pair of elongated passages each of which opens through said sharp end portion, a first one of said passages comprising a liquid flow passage which extends from said sharp end portion to the opposite end portion of the body means and opens therethrough, said body means including a laterally extending air inlet projection, said other passage comprising an air passage in communication with said air inlet portion, said liquid flow passage tapering from said opposite end portion toward said sharp end portion with its least cross sectional dimension disposed at said sharp end portion, said air passage also defining a substantial tapered portion which tapers away from said sharp end portion with the largest cross sectional dimension at said sharp end portion, an air filter means comprising an elongated hollow member having an open end fitting about said laterally extending air inlet projection and including a peripherally extending rib engaging said air inlet portion projection for providing a seal therewith, said air filter means having an air opening at the opposite end thereof, said air inlet means defining two chamber portions and having two separate filter bodies disposed in said chamber portions for filtering any air entering the air filter means through said opening therein, closure cap means, said air filter means including an outer end portion with said closure cap means fitting thereabout, said closure cap means having a substantially cup-shaped main body portion with peripherally extending means thereon engaging the end portion of said air filter means for sealing said opening at the said opposite end of the filter means and to prevent air from entering through said opening in the air filter means, and means for removing said closure cap means from about said air filter means to permit the entrance of the air therewithin.

16. Apparatus as defined in claim 15 wherein said body means is provided with a pair of tapered outer surface portions spaced from one another and interconnected by an intermediate sloping shoulder portion, and guard means comprising an elongated hollow body having a closed end and an open end, the open end of said guard means being disposed about the outer surface of said body means, and means providing a seal between said guard means and said body means, said guard means including an intermediate internal shoulder portion in engagement with the shoulder portion formed on the outer surface of said body means for limiting movement of said guard means with respect to said body means, whereby said guard means is adapted to protect the sharp end portion of said body means.

17

17. Apparatus as defined in claim 15 wherein said body means includes an attaching base portion, said attaching base portion including a downwardly directed annular flange defining an annular cavity having internal ribs spaced about the inner surface of said flange for gripping a drip chamber inserted within said cavity.

18. Air filter means for use with a dual flow piercing device as used with intravenous injection apparatus, said air filter means comprising an elongated hollow body having an open end and a closed end, said open end including a peripherally extending rib formed on the inner surface thereof and extending radially inwardly thereof, and said body having a pair of peripherally extending inwardly directed ribs formed on the inner surface thereof, said last-mentioned ribs being spaced from one another and being spaced a substantial distance from said open end, whereby said last-mentioned ribs define two chambers in series with one another and adjacent the closed end of the body, said closed end of the body having a central opening formed therein for admitting air into the interior of the body, and a pair of separate bodies of filter material disposed within the chambers defined within said body for filtering any air entering through said opening.

19. Apparatus as defined in claim 18 wherein said filter bodies comprise absorbent sterile cotton and further including a cap closure means having a main body portion which is substantially cup-shaped in configuration, the closed end portion of said filter means body being of reduced dimension, the cup-shaped portion of said closure cap means fitting snugly about said closed end portion of the filter means, said closure cap means having a peripherally extending internal rib formed thereon engaging the outer surface of the reduced end of said air filter means body for providing a seal therewith, and means for readily removing said closure cap means from sealing engagement with the closed end of said air filter means wherein the closure cap means prevents air from entering through the opening in the air filter means.

20. Intravenous injection apparatus comprising a body means formed of a relatively hard material and having an elongated configuration with a sharp end portion for insertion in a receiving hole, said body means having a pair of passages formed therethrough, each of said passages opening through said sharp end portion, said body means including at the opposite end portion thereof a longitudinally extending extension, said body means having an integral laterally extending projection defining an air inlet portion, one of said passages extending from said sharp end portion and opening through said extension, the other of said passages extending from said sharp end portion and opening into said air inlet portion for admitting air through the body means, means for controlling the flow of air through said air inlet portion, said body means including an attaching base portion comprising an integral annular flange disposed at spaced relationship to said body extension, said flange having a plurality of spaced ribs formed on the internal surface thereof, a drip chamber comprising a generally tubular means formed of flexible material and having an open upper end portion, said open upper end portion being disposed within said annular flange of said attaching base portion of the body means, conduit means connected with the opposite end portion of said drip chamber for conducting liquid therefrom, connector means disposed within the open upper end of said drip chamber and engaging the inner surface thereof for wedging the open upper end of the drip chamber between the connector means and the attaching base portion flange for operatively securing the drip chamber in position, and filter means disposed within said drip chamber and extending in surrounding relationship to the open end of the passage which opens through said body extension for filtering any liquid passing through said last-mentioned passage.

21. Apparatus as defined in claim 20 wherein said connector means is of generally annular configuration having a central bore formed therethrough which fits snugly about the body extension, said connector means having an annular groove formed in the undersurface thereof, and the upper portion of said filter means being disposed within said annular groove and permanently secured therewithin.

22. Intravenous injection apparatus comprising an elongated body means of a substantially rigid material and having a sharp end portion, the outer surface of said body means being tapered to enable the body means to fit snugly within holes of different sizes in a receiving member, said body means having a longitudinally extending extension at the end thereof opposite to said sharp end portion and also having a laterally extending integral projection defining an air inlet portion opening outwardly of said body, said body means having a pair of passages formed therethrough, a first one of said passages comprising a liquid flow passage and extending from said sharp end portion to the end of said body extension, said liquid flow passage tapering from the end of said body extension to said sharp end portion and defining its smallest dimension at said sharp end portion, the other of said passages comprising an air flow passage and including a substantial portion which tapers from said sharp end portion to a spaced portion with the largest cross sectional dimension of the air passage tapered portion being disposed at said sharp end portion, said air passage also being in communication with said air inlet portion, air filter means comprising an elongated hollow body having an open end portion and a closed end portion, said open end portion being fitted snugly about said laterally extending air inlet projection and being sealed therewith, said air filter means including an opposite end portion having an opening formed therethrough for admitting air thereinto, said air filter means having a pair of spaced separate filter bodies disposed therewithin and retained in position for filtering air entering through the opening in said air filter means, closure means mounted on said air filter means and normally fitting thereabout so as to prevent the admission of air through said opening in said air filter means, means for selectively removing said closure means to permit the entry of air through said air filter means and into said air passage, said body means including an attaching base portion comprising an annular flange disposed in spaced surrounding relationship to said body extension, said flange having a plurality of spaced ribs formed on the inner surface thereof, a drip chamber comprising a substantially tubular member formed of a flexible material and including an open upper end portion, conduit means connected with the lower portion of said drip chamber for conducting liquid therefrom, said open upper end of said drip chamber being disposed within said attaching base portion flange, and connector means disposed within the open upper end of said drip chamber, said connector means being of substantially annular configuration and including a central bore which receives said body extension, said connector means having means formed on the outer surface thereof adapted to engage the inner wall of the tubular drip chamber for wedging the wall of the drip chamber between said connector means and said attaching base portion flange for securely attaching the drip chamber to said body means.

23. Apparatus as defined in claim 22 including liquid filter means disposed within said drip chamber, said liquid filter means forming an enclosed space in combination with the lower portion of said body means and said connector means so as to filter all the liquid passing through said liquid flow passage and entering into said drip chamber.

24. Apparatus as defined in claim 23 wherein said connector means is provided with an annular groove in the undersurface thereof, the upper end of said filter means being disposed within and retained in said annular groove for supporting the filter means in operative position.

25. Intravenous injection apparatus comprising a body means formed of a relatively hard material and having a sharp end portion for insertion in a receiving hole, said body means having a pair of passages formed therethrough, each of said passages opening through said sharp end portion, said body means including at the opposite end portion thereof a longitudinally extending extension, said body means having an integral laterally extending air inlet portion, one of said passages extending from said sharp end portion and opening through said extension, the other of said passages extending from said sharp end portion and opening through said air inlet portion for admitting air through the body means, said body means including an attaching base portion comprising an integral annular flange disposed in spaced relationship to said body extension, a dip chamber comprising a generally tubular means formed of flexible material and having an open upper end portion, said open upper end portion being disposed within said annular flange of said attaching base portion of the body means, conduit means connected with the opposite end portion of said drip chamber for conducting liquid therefrom, connector means disposed within the open upper end of said drip chamber and engaging the inner surface thereof for wedging the open upper end of the drip chamber between the connector means and the attaching base portion flange for operatively securing the drip chamber in position, filter means disposed within said drip chamber, said filter means forming an enclosed base in combination with the lower portion of said body means and said connector means so as to filter all the liquid passing from said body means into said drip chamber, and divider means disposed at an intermediate portion of said drip chamber means and dividing the drip chamber means into a filter area and a drip area which are in communication with one another through the intermediary of a drip tube portion.

26. Apparatus as defined in claim 25 wherein said divider means comprises a separate member disposed within said drip chamber means and disposed in tight engagement with the inner wall of said drip chamber means, said divider means including an integral centrally positioned drip tube portion.

27. Apparatus as defined in claim 26 wherein the lower end portion of said filter means is provided with an elongated sealed portion, said divider means being of noncircular formation and including a major access and a minor access, the major access of said divider means being disposed substantially parallel with the lower sealed end of the filter means to prevent the walls of the dip chamber means from coming in contact with the lower end of the filter means.

28. Apparatus as defined in claim 25 wherein said divider means comprises an intermediate sealed portion of the drip chamber means, and a drip tube means disposed centrally within said sealed portion so as to provide communication between the areas within the drip chamber means on either side of the sealed portion thereof.

References Cited by the Examiner

UNITED STATES PATENTS

| 2,696,818 | 12/1954 | Van Loghem | 210—94 X |
| 2,770,234 | 11/1956 | Nesset et al. | 128—214 |
| 2,837,091 | 6/1958 | McMinn et al. | 128—214 |
| 2,884,924 | 5/1959 | Shaw | 128—214 |
| 3,092,106 | 6/1963 | Butler | 128—214 |
| 3,193,993 | 7/1965 | Barton et al. | 128—385 |

FOREIGN PATENTS

| 1,098,628 | 3/1955 | France. |

RICHARD A. GAUDET, *Primary Examiner.*

D. L. TRULUCK, *Examiner.*